(12) United States Patent
Desappan et al.

(10) Patent No.: US 11,748,599 B2
(45) Date of Patent: Sep. 5, 2023

(54) SUPER-TILING IN NEURAL NETWORK PROCESSING TO ENABLE ANALYTICS AT LOWER MEMORY SPEED

(71) Applicant: TEXAS INSTRUMENTS INCORPORATED, Dallas, TX (US)

(72) Inventors: Kumar Desappan, Bengaluru (IN); Mihir Narendra Mody, Bengaluru (IN); Pramod Kumar Swami, Bengaluru (IN); Anshu Jain, Bengaluru (IN); Rishabh Garg, Patiala (IN)

(73) Assignee: Texas Instruments Incorporated, Dallas, TX (US)

( * ) Notice: Subject to any disclaimer, the term of this patent is extended or adjusted under 35 U.S.C. 154(b) by 544 days.

(21) Appl. No.: 16/797,871

(22) Filed: Feb. 21, 2020

(65) Prior Publication Data
US 2020/0272892 A1 Aug. 27, 2020

(30) Foreign Application Priority Data
Feb. 21, 2019 (IN) .............................. 201941006834

(51) Int. Cl.
*G06F 12/00* (2006.01)
*G06N 3/063* (2023.01)
(Continued)

(52) U.S. Cl.
CPC ......... *G06N 3/063* (2013.01); *G06F 12/0804* (2013.01); *G06N 3/08* (2013.01); *G06T 1/60* (2013.01)

(58) Field of Classification Search
CPC ...... G06N 3/063; G06N 3/08; G06F 12/0804; G06T 1/60
See application file for complete search history.

(56) References Cited

U.S. PATENT DOCUMENTS 9,710,265 B1 * 7/2017 Temam .................. G06N 3/04
9,836,691 B1 * 12/2017 Narayanaswami .... G06N 3/063
(Continued)

FOREIGN PATENT DOCUMENTS

| CN | 109389214 A | * | 2/2019 | ............. G06F 13/00 |
| WO | WO-2018154494 A1 | * | 8/2018 | ......... G06F 9/45533 |

OTHER PUBLICATIONS

Baranwal, A. et al. "DeCoILFNet: Depth Concatenation and Inter-Layer Fusion Based ConvNet Accelerator." arXIV:1901.02774v1 [cs.DC] Dec. 1, 2018, pp. 1-7.
(Continued)

*Primary Examiner* — Cheng Yuan Tseng
(74) *Attorney, Agent, or Firm* — Michael T. Gabrik; Frank D. Cimino (57) ABSTRACT

Techniques including receiving a first set of values for processing by a machine learning (ML) network, storing a first portion of the first set of values in an on-chip memory, processing the first portion of the first set of values in a first layer of the ML network to generate a second portion of a second set of values, overwriting the stored first portion with the generated second portion, processing the second portion in a second layer of the ML network to generate a third portion of a third set of values, storing the third portion, repeating the steps of storing the first portion, processing the first portion, overwriting the stored first portion, processing the second portion, and storing the third portion for a fourth portion of the first set of values until all portions of the first set of values are processed to generate the third set of values.

20 Claims, 10 Drawing Sheets

(51) Int. Cl.
*G06T 1/60* (2006.01)
*G06F 12/0804* (2016.01)
*G06N 3/08* (2023.01)

(56) References Cited

U.S. PATENT DOCUMENTS

| | | | | |
|---|---|---|---|---|
| 10,140,252 | B2* | 11/2018 | Fowers | G06N 3/04 |
| 10,175,912 | B1* | 1/2019 | Temam | G06N 3/04 |
| 10,248,908 | B2* | 4/2019 | Temam | G06N 3/063 |
| 10,346,093 | B1* | 7/2019 | Wu | G11C 7/1075 |
| 10,795,678 | B2* | 10/2020 | Fowers | G06F 9/3001 |
| 11,003,990 | B2* | 5/2021 | Shirahata | G06V 10/82 |
| 11,055,063 | B2* | 7/2021 | Goyal | G06F 7/523 |
| 11,170,294 | B2* | 11/2021 | Bruestle | G06F 7/76 |
| 11,340,936 | B2* | 5/2022 | Lee | G06F 9/5066 |
| 2016/0239706 | A1* | 8/2016 | Dijkman | G06N 3/045 |
| 2018/0322386 | A1* | 11/2018 | Sridharan | G06T 15/005 |
| 2018/0322387 | A1* | 11/2018 | Sridharan | G06N 3/04 |
| 2019/0042092 | A1* | 2/2019 | Wu | G06N 3/063 |
| 2019/0050717 | A1* | 2/2019 | Temam | G06F 17/16 |
| 2019/0087721 | A1* | 3/2019 | Prakash | G06N 3/042 |
| 2019/0220734 | A1 | 7/2019 | Ferdman et al. | |
| 2019/0294968 | A1* | 9/2019 | Vantrease | G06N 3/063 |
| 2019/0392297 | A1* | 12/2019 | Lau | G06N 3/04 |
| 2020/0082258 | A1* | 3/2020 | Gold | G06V 10/774 |
| 2020/0104690 | A1* | 4/2020 | Bai | G06N 3/0454 |
| 2020/0117981 | A1* | 4/2020 | Arthur | G06N 3/0481 |
| 2020/0167654 | A1* | 5/2020 | Guo | G06N 3/063 |
| 2020/0210840 | A1* | 7/2020 | Darvish Rouhani | G06N 3/063 |
| 2020/0242474 | A1* | 7/2020 | Lo | G06N 3/063 |
| 2020/0264876 | A1* | 8/2020 | Lo | G06K 9/6262 |
| 2022/0092386 | A1* | 3/2022 | Zhou | G06N 3/0454 |

OTHER PUBLICATIONS

Xiao, Q. et al. "Exploring Heterogeneous Algorithms for Accelerating Deep Convolutional Neural Networks on FPGAs." DAC '17, Austin, TX, USA. DOI: http://dx.doi.org/101145/3061639.3062244.

Wang, J. et al. "Efficient Hardware Architectures for Deep Convolutional Neural Network." IEEE Transactions on Circuits and Systems—I: Regular Papers, vol. 65, No. 6, Jun. 2018, pp. 1941-1953.

Wang, Y. et al. "Towards Memory-Efficient Allocation of CNNs on Processing-in-Memory Architecture." IEEE Transactions on Parallel and Distributed Systems, vol. 29, No. 6, Jun. 2018, pp. 1428-1441.

Li, G. et al. "Block Convolution: Towards Memory-Efficient Inference of Large-Scale CNNs on FPGA." Design, Automation and Test in Europe (DATE 2018), pp. 1163-1166.

Zhao, Z. et al. "DeepThings: Distributed Adaptive Deep Learning Inference on Resource-Constrained IoT Edge Clusters." IEEE Transactions on Computer-Aided Design of Integrated Circuits and Systems, vol. 37, No. 11, Nov. 2018, pp. 2348-2359.

Wang, J. et al. "Bandwidth Efficient Architectures for Convolutional Neural Network." IEEE Workshop on Signal Processing Systems, 2018, pp. 94-99.

Seto, K. et al. "Small Memory Footprint Neural Network Accelerators." 20th Int'l Symposium on Quality Electronic Design, 2019 IEEE, pp. 253-258.

Lee, J. et al. "A Full HD 60 fps CNN Super Resolution Processor with Selective Caching Based Layer Fusion for Mobil Devices." 2019 Symposium on VLSI Circuits Digest of Technical Papers, 2019 JSAP, pp. C302-C303.

Hu, Y. et al. "On-chip Instruction Generation for Cross-Layer CNN Accelerator on FPGA." 2019 IEEE Computer Society Annual Symposium on VLSI (ISVLSI), pp. 7-12.

Peemen, M. "Improving the Efficiency of Deep Convolutional Networks." Eindhoven University of Technology, Published: Dec. 10, 2017 (171 pages).

Peemen, M. et al. "A Data-Reuse Aware Accelerator for Large-Scale Convolutional Networks." pp. 1-3.

Alwani, M. et al. "Fused-Layer CNN Accelerators." 2016 IEEE (12 pages).

Yu, J. et al. "Instruction Driven Cross-Layer CNN Accelerator with Winograd Transformation on FPGA." 2017 IEEE (4 pages).

Yu, J. et al. "[DL] Instruction Driven Cross-Layer CNN Accelerator for Fast Detection on FPGA." ACM Transactions on Reconfigurable Technology and Systems, vol. 9, No. 4, Article 11. Pub. Date Dec. 2017, pp. 11:1-11:23.

* cited by examiner

SUPER-TILING IN NEURAL NETWORK PROCESSING TO ENABLE ANALYTICS AT LOWER MEMORY SPEED

CROSS-REFERENCE TO RELATED APPLICATIONS

This application claims priority to India Provisional Application No. 201941006834, filed Feb. 21, 2019, which is hereby incorporated by reference.

BACKGROUND

Machine learning (ML) is becoming an increasingly important part of the computing landscape. Machine learning is a type of artificial intelligence (AI) and ML helps enable a software system to learn to recognize patterns from data without being directly programmed to do so. Convolutional neural networks (CNN) are a type of ML which utilize a convolution operation. A convolution operation is a mathematical transformation applied to two functions to produce a third function which expresses how the shape of one function is modified by the second function. Examples of CNNs include deconvolutional neural networks, pooling neural networks, up-sample neural networks, deep neural networks, etc. CNNs are often used in a wide array of applications typically for recognition and classification, such as image recognition and classification, prediction and recommendation systems, speech and language recognition and translation, etc. As CNNs become increasingly useful, there is a desire to execute complex CNNs efficiently in devices with relatively limited compute and memory resources, such as embedded, or other low-power devices.

SUMMARY

This disclosure relates to a method, comprising receiving a first set of values for processing by a machine learning network having multiple layers, storing a first portion of the first set of values in an on-chip memory, wherein the first portion is less than all values of the first set of values, processing the first portion of the first set of values in a first layer of the machine learning network to generate a second portion of a second set of values, overwriting the stored first portion of the first set of values with the generated second portion, processing the second portion of the second set of values in a second layer of the machine learning network to generate a third portion of a third set of values, storing the third portion of the third set of values to a memory, repeating the steps of storing the first portion of the first set of values, processing the first portion, overwriting the stored first portion, processing the second portion, and storing the third portion for a fourth portion of the first set of values until all portions of the first set of values have been processed to generate all portions of the third set of values, and outputting the third set of values.

Another aspect of the present disclosure relates to an on-chip memory and one or more processors operatively coupled to the cache memory, wherein the one or more processors are configured to execute non-transitory instructions causing the one or more processors to receive a first set of values for processing by a machine learning network having multiple layers, store a first portion of the first set of values in the cache memory, wherein the first portion is less than all values of the first set of values, process the first portion of the first set of values in a first layer of the machine learning network to generate a second portion of a second set of values, overwrite the stored first portion of the first set of values with the generated second portion, process the second portion of the second set of values in a second layer of the machine learning network to generate a third portion of a third set of values, store the third portion of the third set of values to a memory, repeat the steps of storing the first portion of the first set of values, processing the first portion, overwriting the stored first portion, processing the second portion, and storing the third portion for a fourth portion of the first set of values until all portions of the first set of values have been processed to generate all portions of the third set of values, and output the third set of values.

Another aspect of the present disclosure relates to a non-transitory program storage device comprising instructions stored thereon to cause one or more processors to receive a first set of values for processing by a machine learning network having multiple layers, store a first portion of the first set of values in an on-chip memory, wherein the first portion is less than all values of the first set of values, process the first portion of the first set of values in a first layer of the machine learning network to generate a second portion of a second set of values, overwrite the stored first portion of the first set of values with the generated second portion, process the second portion of the second set of values in a second layer of the machine learning network to generate a third portion of a third set of values, store the third portion of the third set of values to a memory, repeat the steps of storing the first portion of the first set of values, processing the first portion, overwriting the stored first portion, processing the second portion, and storing the third portion for a fourth portion of the first set of values until all portions of the first set of values have been processed to generate all portions of the third set of values, and output the third set of values.

BRIEF DESCRIPTION OF THE DRAWINGS

For a detailed description of various examples, reference will now be made to the accompanying drawings in which.

DETAILED DESCRIPTION

Figure 1:
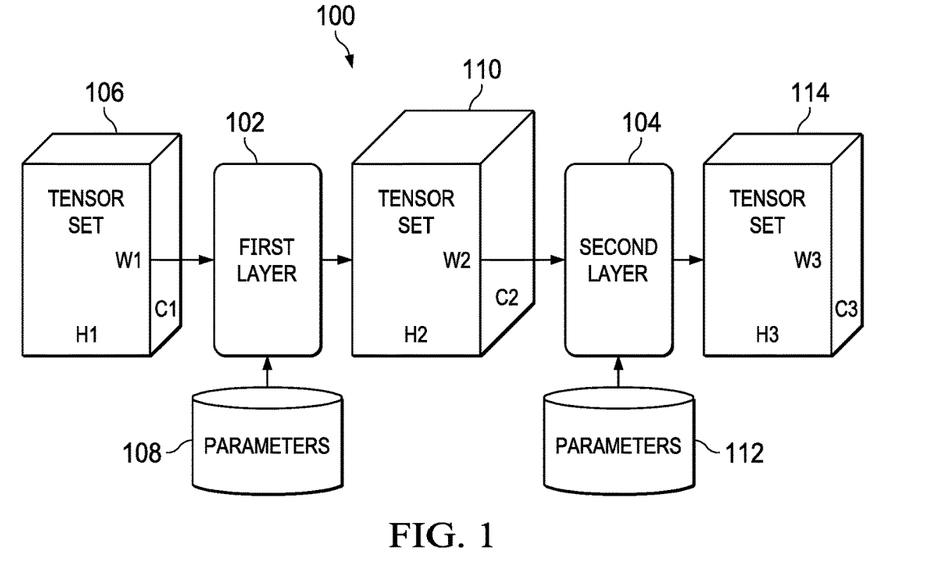
FIG. 1 illustrates a dataflow through an example CNN.

FIG. 1 illustrates a dataflow through an example CNN 100. The CNN 100 shown here includes two layers, first layer 102 and second layer 104. While this example CNN includes two layers, it may be understood that other CNNs can include any number of layers. The layers represent a mathematical function performed for an input tensor and result in an output tensor. Examples of the mathematical functions include convolution/deconvolution functions, pooling, elementwise add, concatenate, etc. The tensors are generalized matrices of N dimensions and include one or more nodes, which contain values. As an example, for an image, a node may describe a pixel and may include values for an x and y coordinate of the pixel as well as values for the R, G, and B channels describing the color of the pixel. The tensor may have a height axis, here represented by H1, H2, H3 and width axis W1, W2, and W3 corresponding to the dimensions of the image, as well as a channel axis, represented by C1, C2, and C3, corresponding to the color channel information (RGB information). In this example, a first tensor 106 is input into the first layer 102 along with a set of operational parameters 108 to produce a second tensor 110, Similarly, the second tensor 110 may be input into the second layer 104, processed based on operation parameters 112 and output a third tensor 114. The operational parameters 108 and 112 may include, for example, weights to apply to the processing a given layer. Generally, the initial tensor, such as the first tensor 106 is the input into the CNN 100, and the last tensor, here the third tensor 114, is the output from the CNN 100. Tensors in between the input and output tensor, here the second tensor 110, may be referred to as intermediate tensor.

Figure 2:
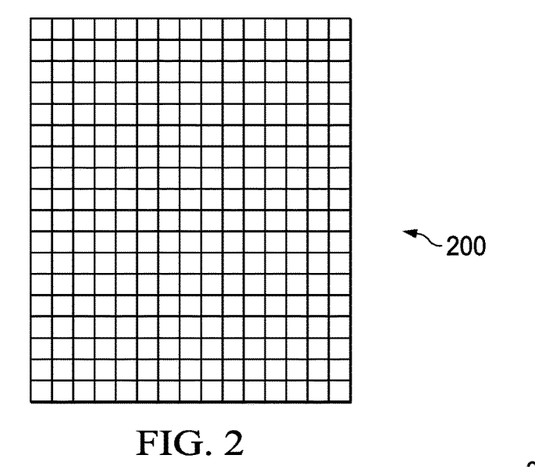
FIG. 2 illustrates tiling for a tensor.

In certain cases, a tensor may be split into tiles for processing, as shown in tensor 200 of FIG. 2, where the tiles may be sized based, for example, on the pipeline design of the processor. For example, a tile may include one or more nodes based on a number of parallel pipelines available on a processor. Of note, going forward, tensors are shown as two-dimensional structures for the sake of clarity. In common implementations, all tiles of a given tensor are processed by a particular layer before processing starts on the next tensor and layer. For example, referring back to FIG. 1, processing of the first tensor 106 in the first layer 102 may be completed for the entire first tensor 106 and output to the second tensor 110 before processing of the second tensor 110 in the second layer 104.

Generally, it is advantageous to be able to store as much information required to execute a CNN in a memory as close as possible to the processor to help performance. Generally, memory close to a processor may be referred to as on-chip memory, while memory that is relatively further from the memory may be referred to as system memory, main memory, or random access memory (RAM), and even further memory may be referred to as storage, disk, or hard disk. Examples of on-chip memory include static random access memory (SRAM) and cache memory. Cache memory may further be divided into levels, such as level 1 (L1), level 2 (L2), and level 3 (L3), with higher numbers generally indicating that the cache is further away (e.g., slower to access) from the processor. As an example of processing an intermediate input tensor in a corresponding layer, the input tensor may be stored in a level 3 (L3) memory cache, while weights, CNN model, and input tile and output information are stored in a level 2 (L2) cache. As portions of the tensor are processed, output may be stored temporarily in L2 cache and then output to another intermediate tensor, for example, in L3 cache as the input tensor is processed. Outputting the next tensor into the L3 cache helps prepare the system to process the next layer. In certain cases, the initial input tensor and final output may be stored in system memory. Storing and accessing intermediate tensors entirely in cache helps reduce the need to access external memory, such as system memory, like double data rate (DDR) memory, which can take a number of clock cycles and reduce processing efficiency as the processor may need to stall while waiting for data.

While the size of a memory may be fixed, the size required by an intermediate tensor can vary. For example, a CNN may have a half megabyte (MB) sized input tensor and may be associated with two intermediate tensors of 5 MB and 12 MB, respectively. If, for example, a near processor memory such as a L3 cache is only 8 MB, the 12 MB intermediate tensor will not be able to entirely fit within the L3 cache and a portion of the 12 MB intermediate tensor will likely be stored in system memory. As memory access to system memory take substantially longer than accessing cache memory, in this case, processing times for the 12 MB intermediate tensor would be bottlenecked by memory input/output times.

Figure 3A:
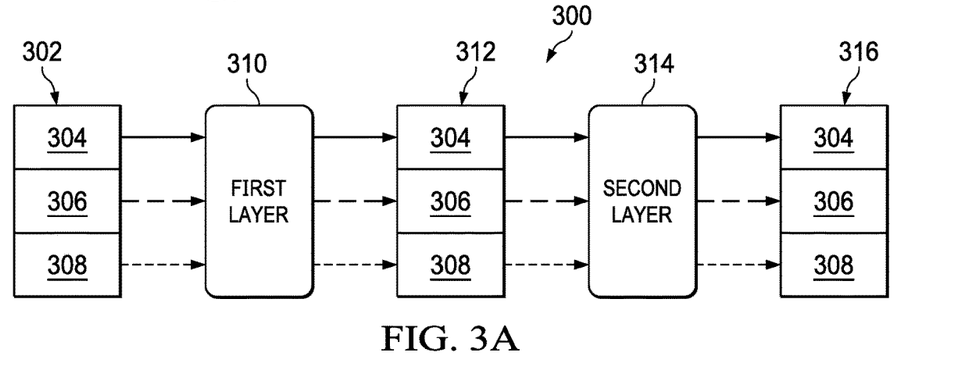
FIG. 3A is a block diagram illustrating super tile processing, in accordance with aspects of the present disclosure.

FIG. 3A is a block diagram illustrating super tile processing 300, in accordance with aspects of the present disclosure. Rather than processing an entire tensor through a layer before moving processing the next tensor and layer, a portion of a tensor may be processed across multiple layers as a super the before the next super tile is processed. For example, as shown in FIG. 3, the first tensor 302 may be divided into three portions, or super tiles, super tile 304, 306, and 308. Super tile 304 may be processed in the first layer 310 to output super the 304, which is a portion of a second tensor 312. Similarly, super tile 304 of the second tensor 312 may then be processed in the second layer 314 to output super tile 304 of third tensor 316. Super tile 304 is thus processed across multiple layers before super tile 306 is processed. In this example, the super tile performed across the height axis or dimension. In other cases, super tiling may be performed in other axis, such as the horizontal or vertical axis by removing values from one dimension of a tensor. After super tile 304 is processed by a set of layers, super tile 306 is then processed by the set of layers. After processing of super tile 306 is complete, super tile 308 is then processed by the set of layers.

Figure 3B:
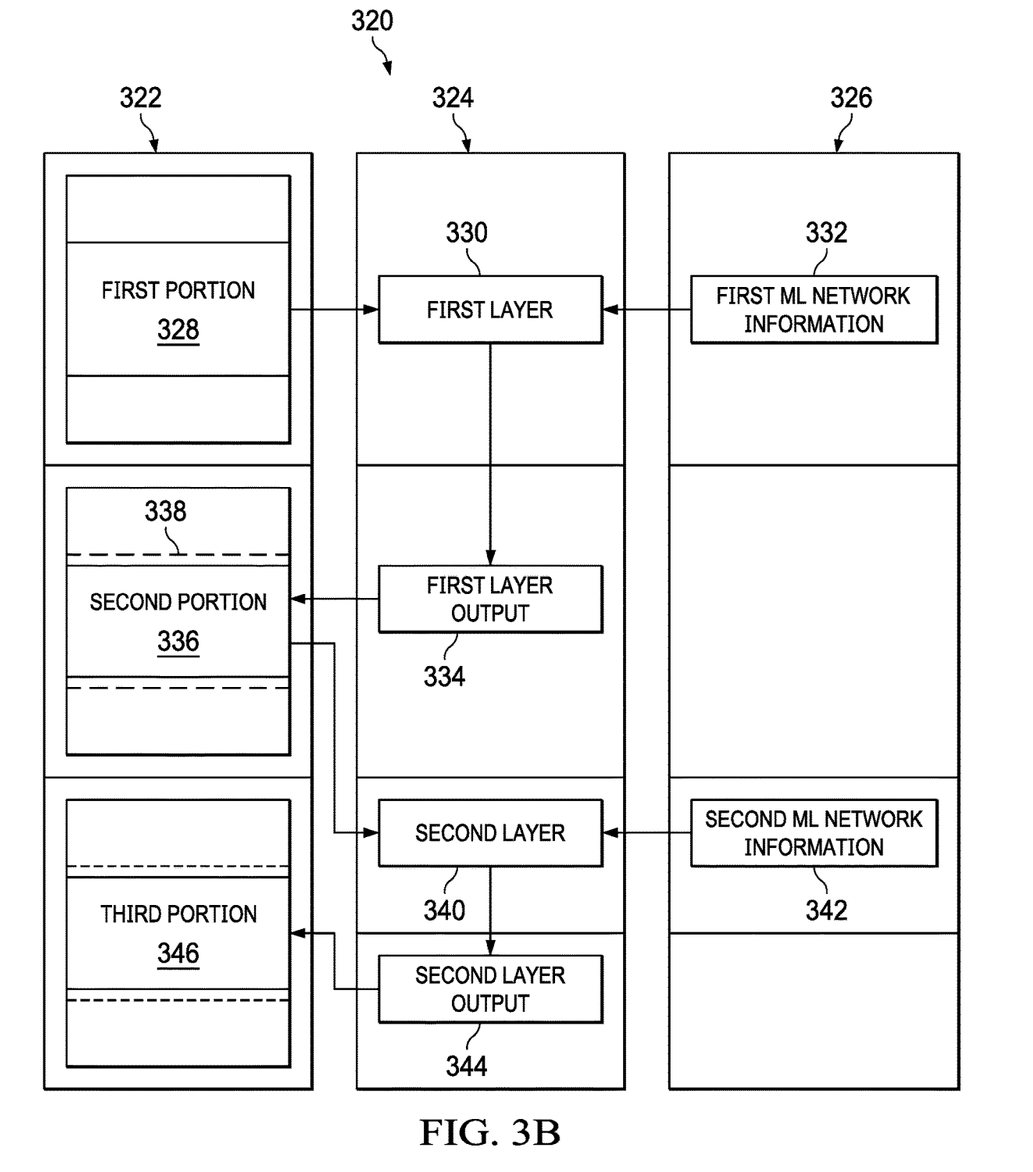
FIG. 3B is a block diagram illustrating super tike processing resource usage, in accordance with aspects of the present disclosure.

In certain cases, a portion of an input tensor is overwritten by a corresponding output of processing that portion of input tensor. FIG. 3B is a block diagram illustrating super tile processing resource usage 320, in accordance with aspects of the present disclosure. This example illustrates an on-chip memory 322, a processor 324 and another memory 326. In this example, the memory 322 includes a first portion 328 of a first tensor. The first portion 328, in this example, may be an intermediate tensor output from a previous layer (not shown). The first portion 328 may be processed in a first layer 330 in conjunction with first ML network information 332 with model and/or weight information to produce a first layer output 334. The first output 334 is written back into the on-chip memory 322, overwriting portions of the on-chip memory 322 which were storing the first portion 328 to obtain a second portion 336 of a second tensor. In certain cases, the second portion 336 may be a different size than the first portion 328. When the second portion 336 is smaller in size as compared to the first portion 328, the remaining portions 338 of the first portion 328 may be discarded. In certain cases, output from the first layer 332 may be dynamically written over corresponding parts of the first portion 328 in the on-chip memory 322 as the output is generated. Once generated, the second portion 336 is processed in a second layer 340 in conjunction with second ML network information 342 to produce a second layer output 344, which is written back into the on-chip memory 322, overwriting portions of the on-chip memory 322 which were storing the second portion 336 to obtain a third portion 346 of a third tensor.

Figure 3C:
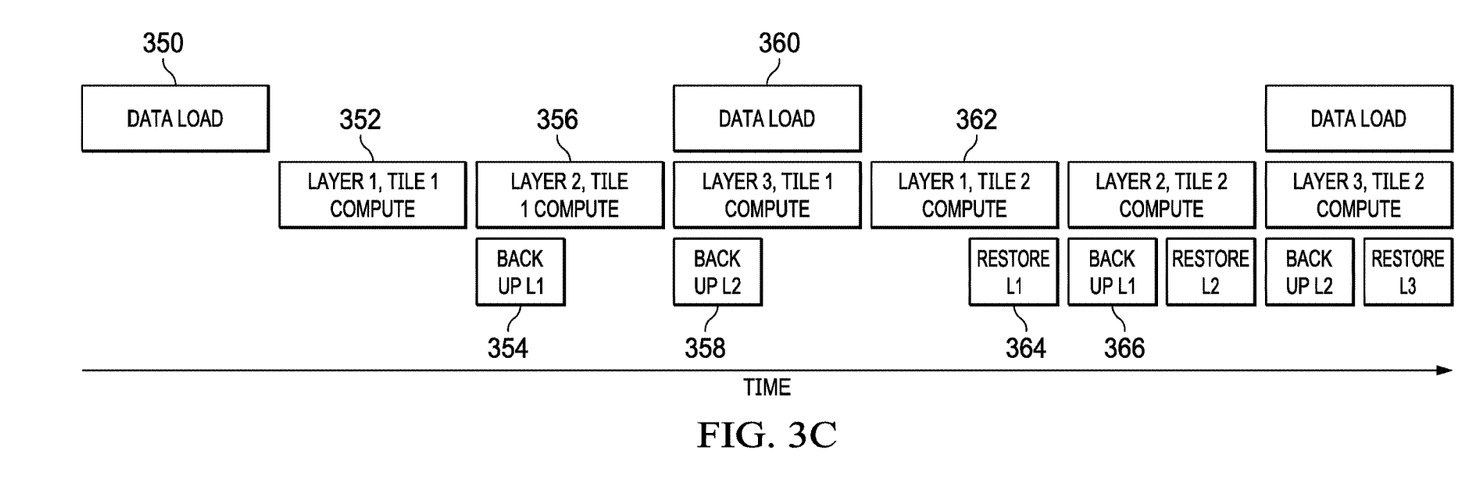
FIG. 3C is a block diagram illustrating super tile processing over time, in accordance with aspects of the present disclosure

FIG. 3C illustrates super tile processing over time, in accordance with aspects of the present disclosure. Initially, data, such as a first input portion of an input tensor, are loaded at block 350 into appropriate memory. Of note, while referred to as an input tensor, the input tensor may comprise an intermediate tensor. At block 352, an input portion of the input tensor is processed as a first super tile and a first portion of a first tensor is written back into on-chip memory over the input portion. At block 354, the first portion of the first tensor are backed up, for example, to another memory. In certain cases, this other memory may comprise system memory or an off-chip cache memory and the backup may be performed by background DMA transfer in parallel with processing the first tensor in a second layer in block 356 to produce a second portion off a second tensor. This second portion is also backed up to another memory at block 358. This background DMA transfer, in certain cases, may be controlled by a memory controller. At block 360, a second input portion of the input tensor may be loaded as a second super tile. The second input portion is then processed at block 362 to generate a third portion of the first tensor. The first tensor may be restored at block 364, merged with the generated third portion and backed up to the other memory at block 366. This process then repeats for other layers and super tiles.

Figure 3D:
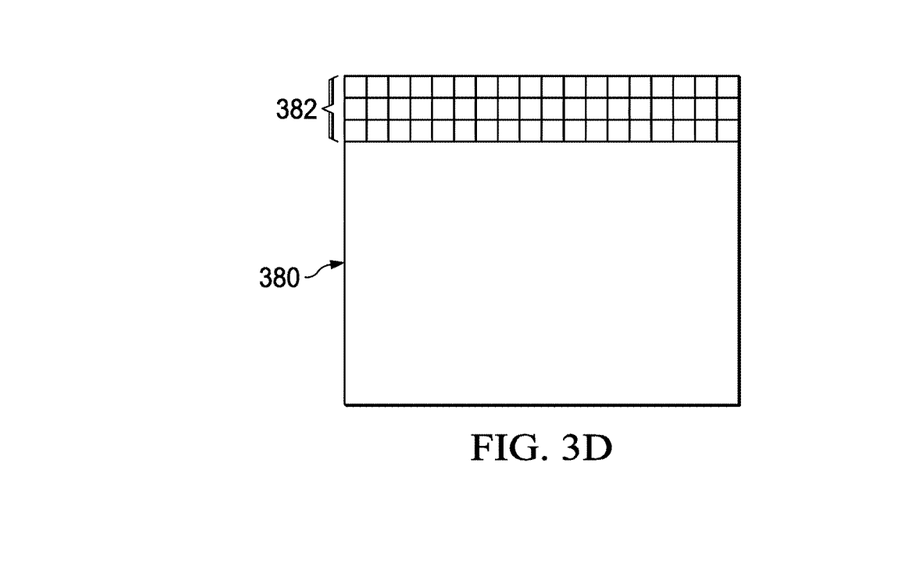
FIG. 3D is a block diagram illustrating tiling within a super tile, in accordance with aspects of the present disclosure.

In certain cases, processing of nodes within a super tile for a tensor may be perform in the same manner as the nodes would be processed absent the super tile. For example, as shown in FIG. 3D, tensor 380 may include a super tile 382, which is then further split into tiles for processing, where the tiles may be sized based, for example, on the pipeline design of the processor. In certain cases, a size of a super tile may be selected such that the output of any given layer in the set of layers associated with a super tile can fit in a particular memory location, such as within L3 cache.

Figure 4A:
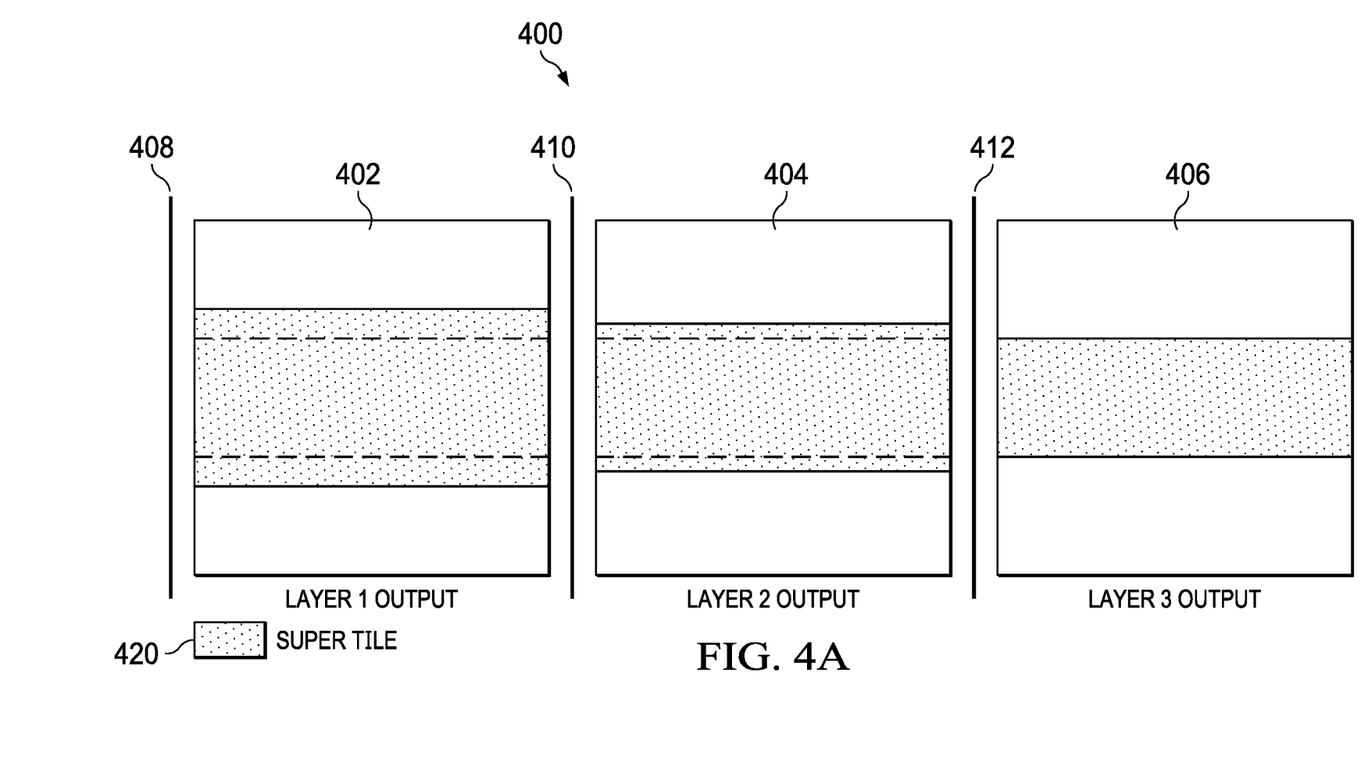
FIG. 4A is a block diagram illustrating a size change of a super tile, in accordance with aspects of the present disclosure.

In accordance with aspects of the present disclosure, super tiles may be grouped across a set of layers and these layers may be used to process super tiles. In certain cases, layer groups may be used to help increase processing and memory bandwidth efficiency. For example, a particular CNN may include ten layers where only the third, fourth, and fifth layers are associated with tensors which may not fit into L3. The third, fourth, and fifth layers may be grouped together into a layer group and processed together using super tiles, while other layers may be processed one layer at a time. In certain cases, a size of a super tile may vary across tensors and layer groups may be used to help control super tile size. FIG. 4A is a block diagram illustrating a size change of a super tile 400, in accordance with aspects of the present disclosure. In certain cases, a node of a tensor may need to be processed along with the node's neighbors. For example, a 3×3 convolution for a given node in a particular layer may require the one neighboring node from each side of the given node. Other layer functions, such as up/down sampling, deconvolution, etc. can also cause the output tensor to have a different size as compared to the input tensor. The example in FIG. 4A shows a relative size of super tile 420 in three tensors 402, 404, and 406. The first tensor 402 is an intermediate tensor and is the output of a first layer 408, the second tensor 404 is the output of a second layer 410, and the third tensor 406 is the output of a third layer 412. As shown here, the dotted line in tensors 402 and 404 represent the size of tensor 406. In this example, the second layer 410 and third layer 412 include functions which required at least one neighbor of the node being processed. Using super tiles to generate the third tensor 406, the second tensor 404 includes nodes which are neighbors of nodes along the edge of the third tensor 406. Thus, a size of the tensor 404 is larger than the third tensor 406. Put another way, the size of an output tensor is a function of the input tensor and can vary for each layer across a super tile. Similarly, the first tensor 402 includes additional nodes used to generate the second tensor 406. As the size of the tensor can vary across the super tile, layer groups may be used in to group together a set of layers and their associated tensors and super tiles defined for the layers and tensors of the layer groups for processing together.

Figure 4B:
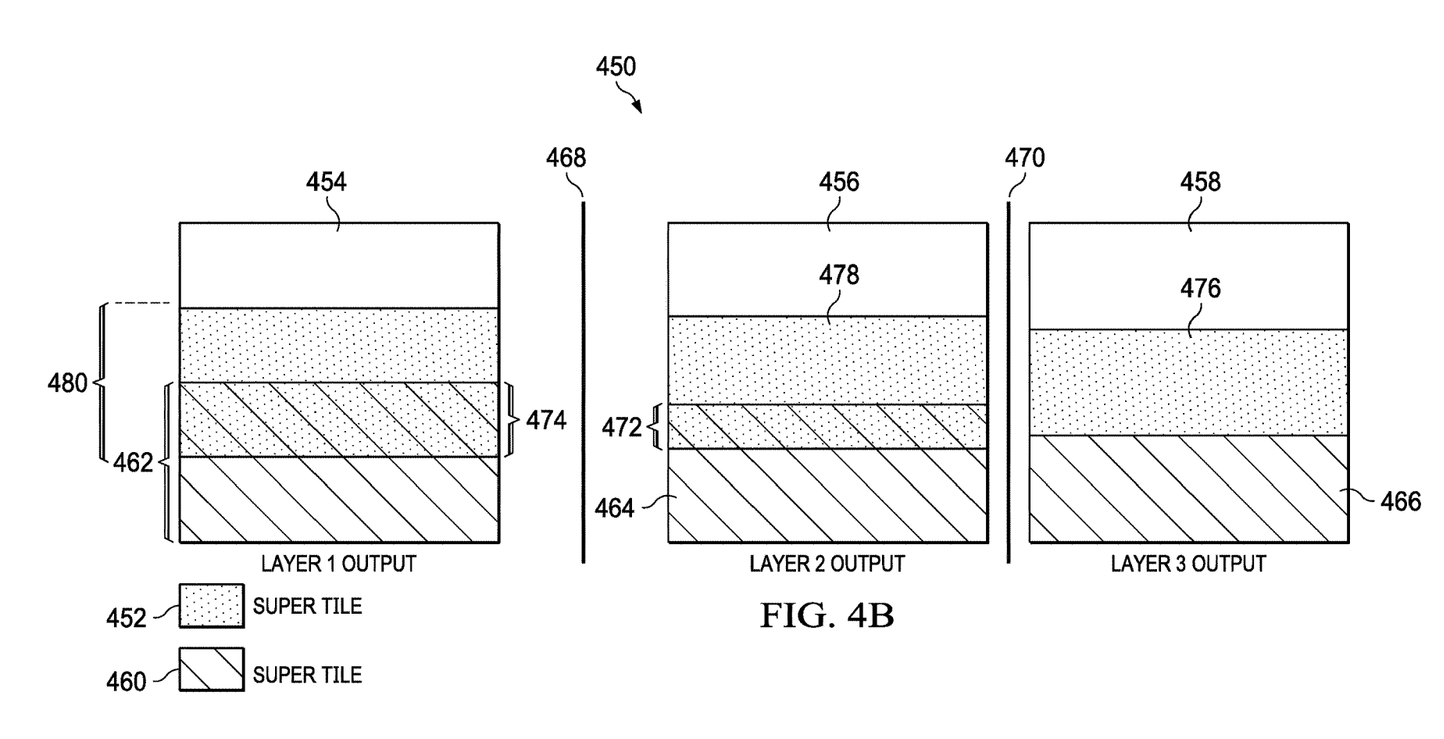
FIG. 4B is a block diagram illustrating super the overlap, in accordance with aspects of the present disclosure.

FIG. 4B is a block diagram illustrating super tile overlap 450, in accordance with aspects of the present disclosure. Building on the example of FIG. 4A, FIG. 4B illustrates two super tiles, first super tile 452 and second super tile 460 across three tensors, a first tensor 454, a second tensor 456, and a third tensor 458. The second tensor 456 is an intermediate tensor and is the output of a second layer 468 and the third tensor 458 is the output of a third layer 470. As in the previous example, the second layer 468 and third layer 470 include functions which required at least one neighbor of the node being processed. Here, a sixth portion 466 of the third tensor 458 for super tile 460 is generated from a fifth portion 464 of the second tensor 456. The fifth portion 464 is generated from a fourth portion 462 of the first tensor 454 for super tile 460. Similarly, a third portion 476 of the third tensor 456 of the third tensor 458 for super tile 452 is generated from a second portion 478 of the second tensor 478, which in turn is generated from a first portion 480 of the first tensor 454. As shown, the fifth portion 464 and second portion 456 have an overlapping area 472 for the second tensor 456. Similarly, the first portion 480 and the fourth portion 462 also have an overlapping area 474 for the first tensor 454. In accordance with aspects of the present disclosure, the computations performed for an overlapping area for generating a first tensor may be stored and used for generating a second tensor. For example, while generating the second portion 478, calculations performed for nodes within the overlapping area 472 may be saved, for example, to cache memory or system memory. These stored calculations may then be reloaded and reused when generating the fifth portion 464. Calculations for the nodes of the overlapping area 472 would not have to be reperformed when generating the fifth portion 464. In certain cases, loading the calculations for the overlapping area 472 may be loaded in parallel to generating the fifth portion 464, for example, using background DMA transfer.

Figure 5:
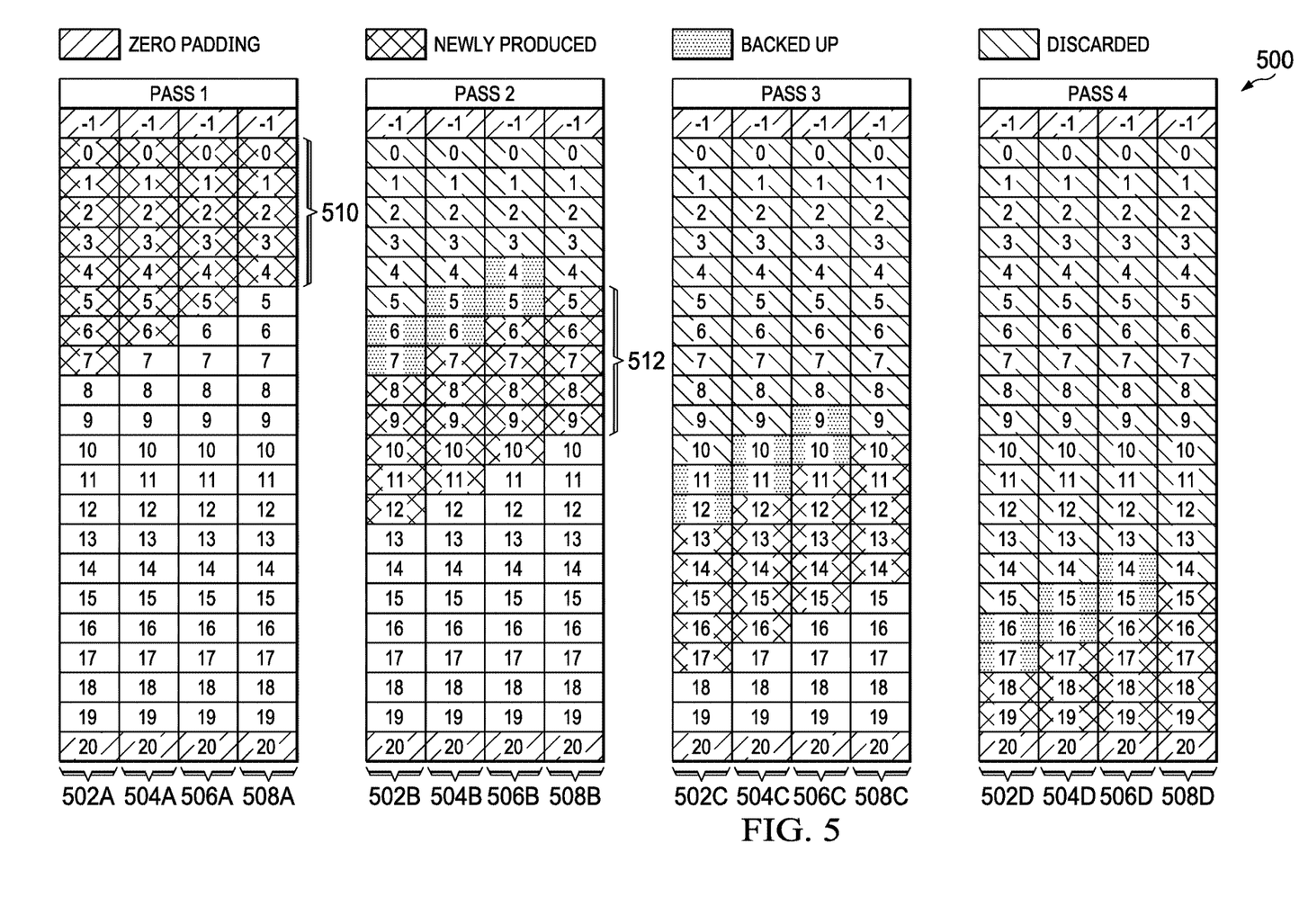
FIG. 5 illustrates super the processing for multiple super the passes, in accordance with aspects of the present disclosure.

FIG. 5 illustrates super tile processing for multiple super tile passes 500, in accordance with aspects of the present disclosure. This example includes a layer group with at least the four intermediate tensors, a first tensor 502A-502D, second tensor 504A-504D, third tensor 506A-506D, and fourth tensor 508A-50D, which are shown here in a single dimension with 20 nodes, with other dimensions omitted for clarity. In this example, the layers have also been omitted. Of note, as the tensors 502-508 in this example are intermediate tensors, the first tensor 502 is an output tensor from a separate input tensor (not shown) and corresponding layer. As before, the first tensor 502 is input into a first layer to generate the second tensor 504, which is input into a second layer to generate the third tensor 506, which is input into a third layer to generate the fourth tensor 508. Four super tile passes are used to generate the complete fourth tensor 508, which may be input into another layer, for example, another layer outside of this layer group.

Each of the layers discussed in this example are 3×3 convolution layers. In a 3×3 convolution layer, each node is processed along with one neighboring node in each dimension for the layer. Each tensor includes two zero pads, represented by the −1 and 20 entries. These zero pads may be used as neighboring nodes when processing nodes on the edge of a given tensor. Here at the end of each super tile pass, the fourth tensor 508 has five completed nodes 510. As each layer is a 3×3 convolution layer, node 5 of the third tensor 506A is used to generate node 4 of the fourth tensor 508A. likewise, node 6 of the second tensor 504A is used to generate node 5 of the third tensor 506A, and so forth. After the first super tile pass is completed, the second super tile pass is performed. As with the first super tile pass, five completed nodes 512 are generated after the second super tile pass the completed. As discussed in conjunction with FIG. 4, there may be overlapping areas as between the super tile passes. For example, nodes 4 and 5 for the third tensor 506B may be used to generate the five completed nodes 512 of the fourth tensor 508B. Nodes 4 and 5 of the third tensor 5063 were previously computed in the first super tile pass and stored. When generating the third tensor 506B, nodes 4 and 5 of the third tensor 506E are reloaded rather than being recomputed. Similarly, nodes 5 and 6 of the second tensor 504B and nodes 6 and 7 of first tensor 502B may also be reloaded. In certain cases, a number of nodes included within a super tile may vary across super tile passes. For example, for the fourth super tile pass, the first tensor 502D may have two nodes, rather than eight nodes as in the other super tile passes. In cases where the size of the tensors varies across the layer group, the size of the largest tensor may be used as a part of determining a size for the super tiles. In this example, as each prior layer requires more nodes to be calculated than the next, the size, and hence memory space required to calculate the nodes of the first tensor 502A for the first pass, would be a limiting factor to the size of the overall super tile. That is, the size of the super tile may be selected to allow the calculations needed for the first tensor 502A in the first pass to fit into a memory, such as the L3 cache.

Figure 6:
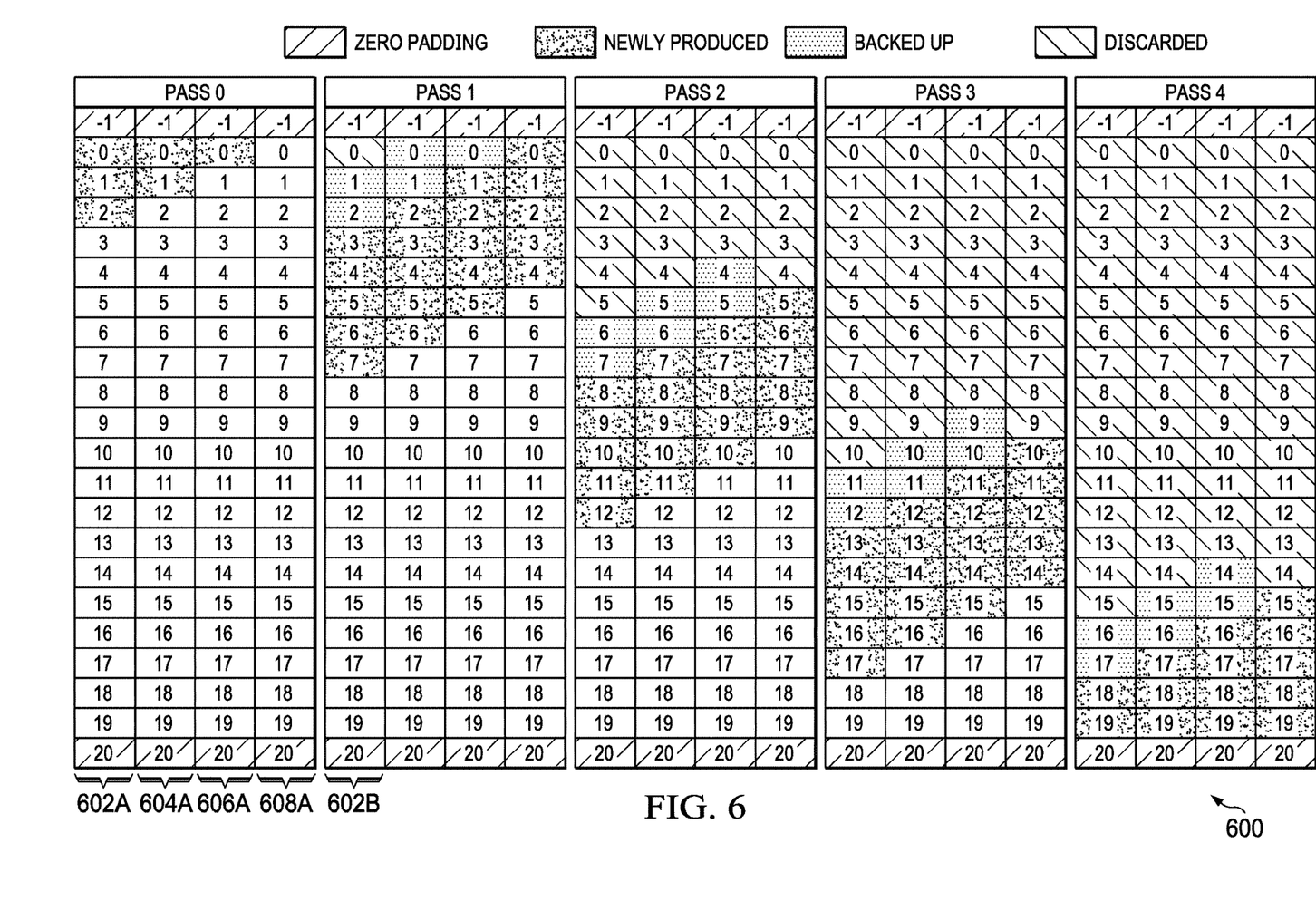
FIG. 6 illustrates a virtual or prewarm pass, in accordance with aspects of the present disclosure.

FIG. 6 illustrates a virtual or prewarm pass 600, in accordance with aspects of the present disclosure. In certain cases, a virtual or prewarming super tile pass may be performed. The virtual super tile pass may not produce a completed node in the last tensor of the layer group. Rather, the virtual super tile pass computes a set of nodes which overlaps with nodes of the first super tile pass and stores these computed nodes. In this example, portions of a first tensor 602A, second tensor 604A, and third tensor 606A are generated. When generating the first tensor 602B, the stored nodes may be loaded rather than recomputed, effectively reducing the amount of memory needed to generate the first tensor 602B. In this example, the effective size of the first tensor 602B, is reduced to five nodes, from eight, matching the size of the tensors in the other passes. The effective sizes of the other tensors in the first pass are also reduced, allowing for a consistent amount of memory usage for the layers of the layer group. Reducing the effective size of the largest tensor helps allow more efficient memory and processor usage as the size of the super tile are set based on the size of the largest tensor.

Figure 7:
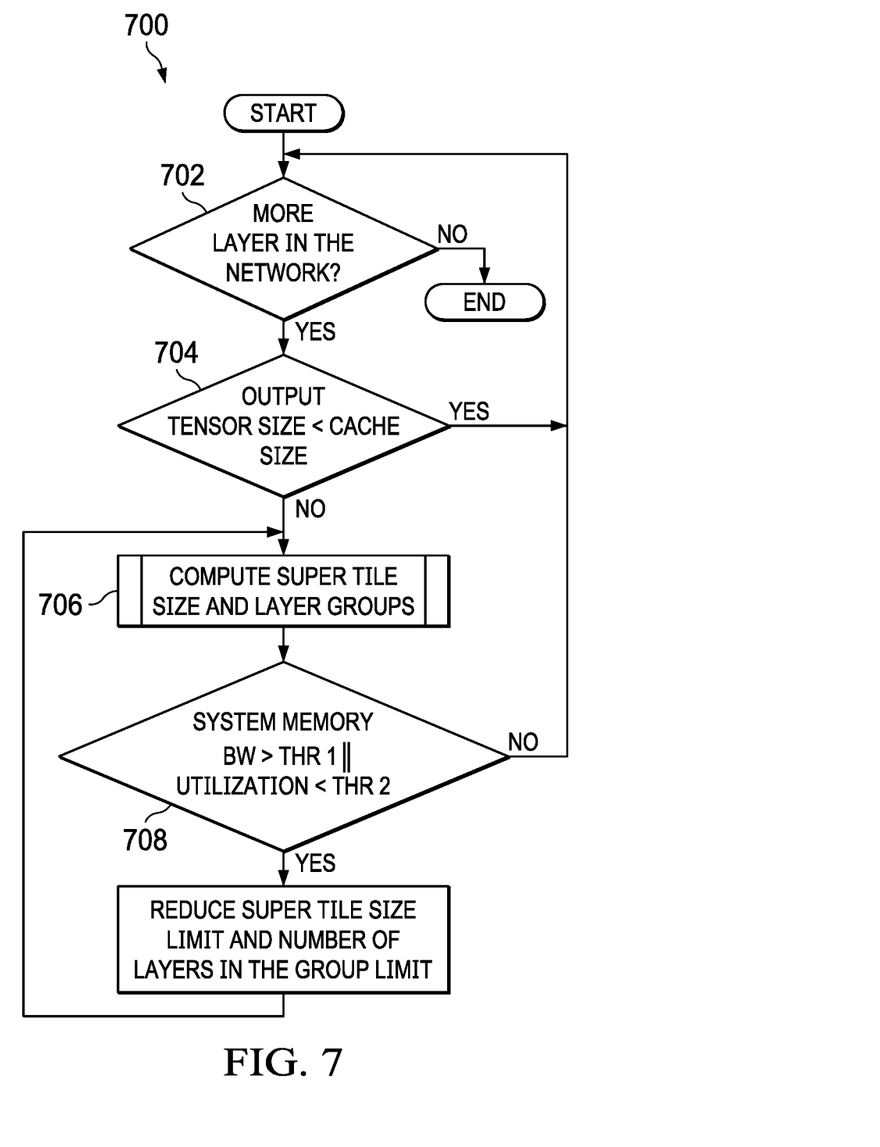
FIG. 7 is a flow diagram illustrating an algorithm for determining a super the size and layer group, in accordance with aspects of the present disclosure.
Figure 8:
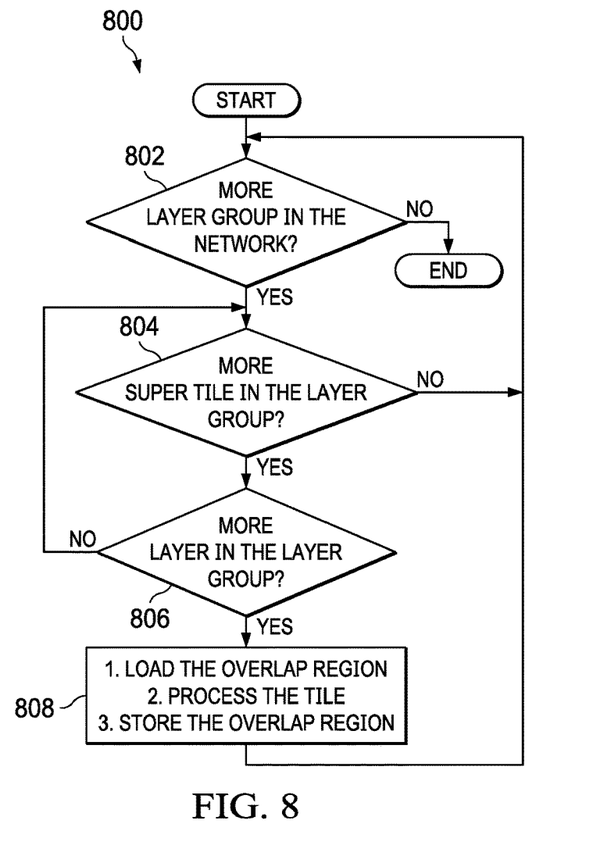
FIG. 8 is a flow diagram illustrating an algorithm for processing a super tile, in accordance with aspects of the present disclosure.

FIG. 7 is a flow diagram illustrating an algorithm for determining a super tile size and layer group 700, in accordance with aspects of the present disclosure. In certain cases, super tile size and layer group sizes may be determined by analyzing a given CNN offline. This offline determination may iteratively analyze the CNN to select a super tile size and layer group size to help maximize processor utilization and reduce usage of system memory. Analysis of the CNN may be performed by monitoring the execution of the CNN to determine sizes associated with the intermediate tensors of the CNN, a number of layers, as well as functions performed by the layers of the CNN. For example, at block 702, the CNN is checked to see if there are any additional layers. If there are additional layers, at block 704, the output tensor of the additional layer is compared to a size of the memory cache. If a size of the output tensor is smaller than the size of the memory cache, analysis proceeds to the next layer at block 702. If a size of the output tensor is greater than the size of the memory cache, then a super tile size and layer group may be determined at block 706. This determination may be made in a number of ways, for example, by examining functions performed by the layer, total size of the output tensor, or even arbitrarily. As a more specific example, the size of an output tensor may be divided by the size of the memory cache to obtain a super tile size. In certain cases, the layer may be analyzed to determine whether the output tensor is performing a convolution across neighboring nodes and an overlapping region size may be determined. The CNN may then be executed using the determined super tile size and layer groups and the system memory bandwidth utilization and processor utilization while executing the super the may be compared to verify that system memory bandwidth utilization is below a threshold amount and/or processor utilization is above a certain threshold amount at block 708. If both thresholds are met, then analysis proceeds to the next layer at block 702. Otherwise at block 710, the super tile size may be reduced and/or the number of layers in the group reduced and execution returns to block 706, FIG. 8 is a flow diagram illustrating an algorithm for processing a super tile 800, in accordance with aspects of the present disclosure. At block 802, if there are more layer groups in a CNN being executed, then at block 802, a check is performed to see if there are any unprocessed super tiles in the layer group. If there are additional layers in the layer group at block 804, then at block 806 if there is an overlap region, load the calculations from the overlap region, process remaining tiles through the layer, and then store any additional overlap regions for the next super tile, if any.

Figure 9:
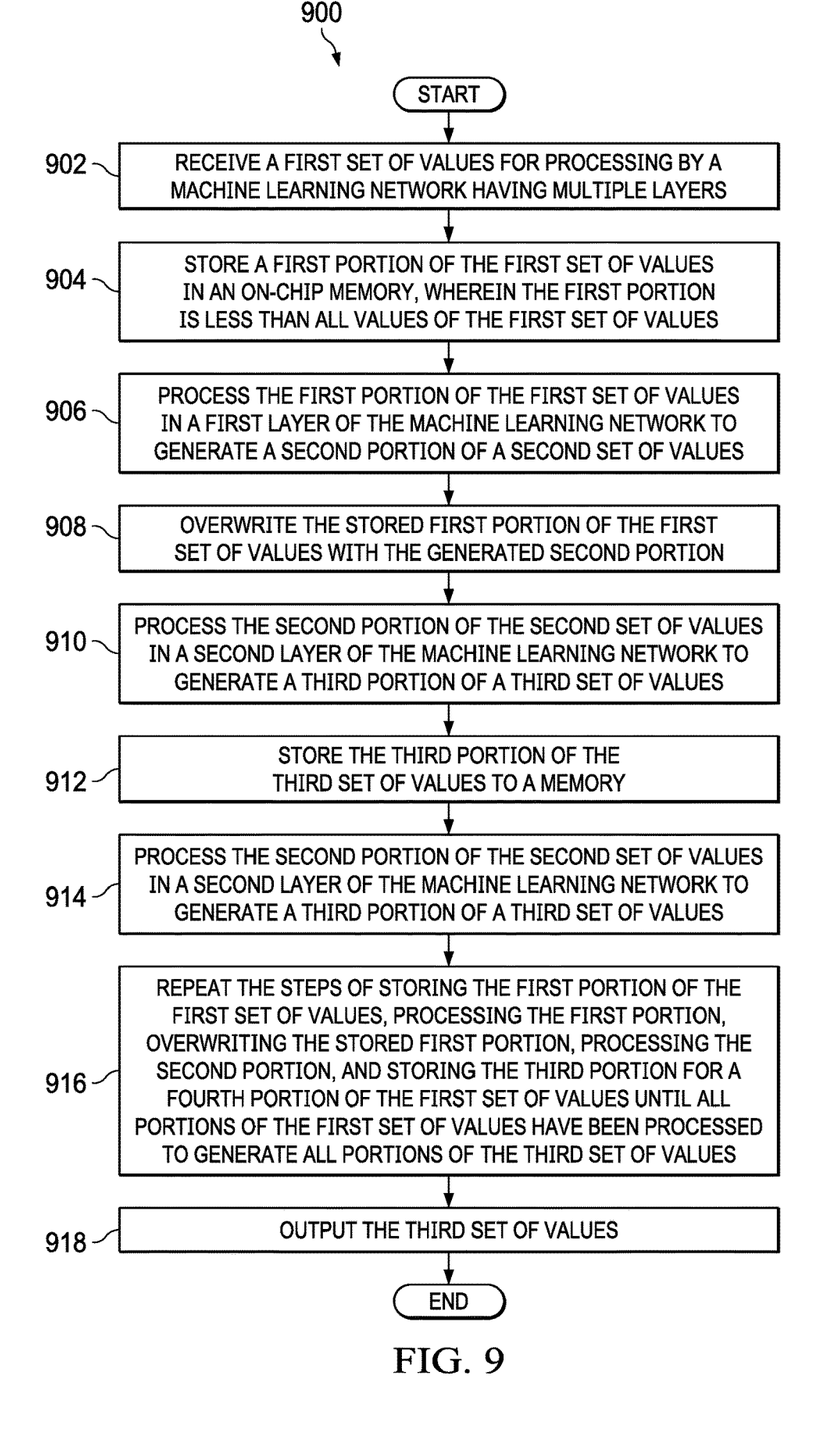
FIG. 9 illustrates a technique for ML network processing, in accordance with aspects of the present disclosure.

FIG. 9 illustrates a technique for ML network processing, in accordance with aspects of the present disclosure. At block 902 a first set of values for processing by a machine learning network having multiple layers is received. For example, a ML network, such as a CNN receives a set of values. The set of values may be organized as a tensor. The first set of values may be an input set of values or an intermediate first set of values. At block 904, a first portion of the first set of values may be stored in an on-chip memory, wherein the first portion is less than all values of the first set of values. For example, a portion of an input tensor may be stored in a L3 cache memory. At block 906, the first portion of the first set of values is processed in a first layer of the machine learning network to generate a second portion of a second set of values. For example, the portion of the input tensor may be processed in an initial ML layer to generate a corresponding portion of a second output tensor. In certain cases, this processing may be performed by splitting the portion of the input tensor into tiles and processing the tiles. At block 908, the stored first portion of the first set of values is overwritten with the generated second portion. For example, as the portion of the input tensor is processed, the processed part of the input tensor is overwritten, in the cache memory, by the output correspond tensor. At block 910, the second portion of the second set of values is processed in a second layer of the machine learning network to generate a third portion of a third set of values. For example, the processed portion of the output tensor of the initial layer is input to a next layer to generate a corresponding portion of a third output tensor. In this manner, the initial portion of the input tensor is processed through multiple layers of the ML network without processing all of the initial input tensor. At block 912, the third portion of the third set of values is stored to a memory. For example, the corresponding portion of the third output tensor is stored in a memory, such as a system memory or cache memory. At block 916, repeating the steps of storing the first portion of the first set of values, processing the first portion, overwriting the stored first portion, processing the second portion, and storing the third portion for a fourth portion of the first set of values until all portions of the first set of values have been processed to generate all portions of the third set of values. For example, the remaining portions of the initial input tensor may be similarly processed to generate the complete third tensor. At block 918, the third set of values is output. For example, the complete output tensor may be output, for example for use by another layer of the ML network or as an output of the ML network. In certain cases, the first and second layers may be grouped in a layer group. As an example, the output third tensor may be further processed in another layer that is not in the layer group.

In certain cases, a predetermined overlapping portion may be defined and generated portions of a tensor, such as the second tensor, may be stored, for example, in another cache memory or system memory. When a next portion of the initial tensor is processed in another super tile pass, the stored generated portions of the tensor, such as the second tensor, may be restored from memory rather than being recalculated. In certain cases, this memory loading may be performed in parallel with generating the other portions of the tensor, for example, using a cache memory controller.

Figure 10:
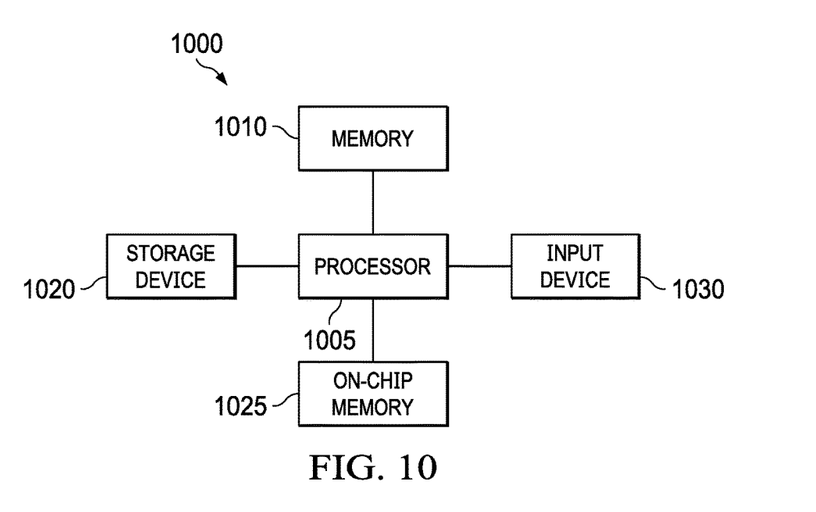
FIG. 10 is a block diagram of an embodiment of a computing device, in accordance with aspects of the present disclosure.

As illustrated in FIG. 10, device 1000 includes a processing element such as processor 1005 that contains one or more hardware processors, where each hardware processor may have a single or multiple processor cores. Examples of processors include, but are not limited to a central processing unit (CPU) or a microprocessor. Although not illustrated in FIG. 10, the processing elements that make up processor 1005 may also include one or more other types of hardware processing components, such as graphics processing units (GPUs), application specific integrated circuits (ASICs), field-programmable gate arrays (FPGAs), and/or digital signal processors (DSPs). In certain cases, processor 1005 may be configured to perform the tasks described in conjunction with FIGS. 7-9.

The processor 1005 is operatively and communicatively coupled to on-chip memory 1025, such as a cache memory, SRAM, registers, etc. With respect to cache memory, cache memory may include one or more L1 caches, one or more L2 caches, and one or more L3 caches. The L1 cache may be integrated in a package with the processor 1005. The L2 and/or L3 caches may also be integrated in the processor package or may be in a package separate from the processor package. In certain cases, the L2 and/or L3 caches, or portions thereof may be integrated with a memory controller, which helps manage memory traffic to the processor 1005.

FIG. 10 illustrates that memory 1010 may be operatively and communicatively coupled to processor 1005. Memory 1010 may be a non-transitory computer readable storage medium configured to store various types of data. For example, memory 1010 may include one or more volatile devices such as random access memory (RAM). In certain cases, the SRAM and circuits as described in FIGS. 4-8 may be part of the memory 1010. Non-volatile storage devices 1020 can include one or more disk drives, optical drives, solid-state drives (SSDs), tap drives, flash memory, electrically programmable read only memory (EEPROM), and/or any other type memory designed to maintain data for a duration time after a power loss or shut down operation. The non-volatile storage devices 1020 may also be used to store programs that are loaded into the RAM when such programs executed.

Persons of ordinary skill in the art are aware that software programs may be developed, encoded, and compiled in a variety of computing languages for a variety of software platforms and/or operating systems and subsequently loaded and executed by processor 1005. In one embodiment, the compiling process of the software program may transform program code written in a programming language to another computer language such that the processor 1005 is able to execute the programming code. For example, the compiling process of the software program may generate an executable program that operates a ML network.

After the compiling process, the encoded instructions may then be loaded as computer executable instructions or process steps to processor 1005 from storage 1020, from memory 1010, and/or embedded within processor 1005 (e.g., via a cache or on-board ROM). Processor 1005 may be configured to execute the stored instructions or process steps in order to perform instructions or process steps to transform the computing device into a non-generic, particular, specially programmed machine or apparatus. Stored data, e.g., data stored by a storage device 1020, may be accessed by processor 1005 during the execution of computer executable instructions or process steps to instruct one or more components within the computing device 1000. Storage 1020 may be partitioned or split into multiple sections that may be accessed by different software programs. For example, storage 1020 may include a section designated for specific purposes, such as storing program instructions or data for updating software of the computing device 1000. In one embodiment, the software to be updated includes the ROM, or firmware, of the computing device. In certain cases, the computing device 1000 may include multiple operating systems. For example, the computing device 1000 may include a general-purpose operating system which is utilized for normal operations. The computing device 1000 may also include another operating system, such as a bootloader, for performing specific tasks, such as upgrading and recovering the general-purpose operating system, and allowing access to the computing device 1000 at a level generally not available through the general-purpose operating system. Both the general-purpose operating system and another operating system may have access to the section of storage 1020 designated for specific purposes.

The one or more communications interfaces may include a radio communications interface for interfacing with one or more radio communications devices. In certain cases, elements coupled to the processor may be included on hardware shared with the processor. For example, the on-chip memory 1025, storage, 1020, and memory 1010 may be included, along with other elements such as the digital radio, in a single chip or package, such as in a system on a chip (SOC). Computing device may also include input and/or output devices, not shown, examples of which include sensors, cameras, human input devices, such as mouse, keyboard, touchscreen, monitors, display screen, tactile or motion generators, speakers, lights, etc.

In some examples, computing device 1000 may be a system on a chip (SoC) that includes multiple processing units. The multiple processing units may include any combination of microprocessors, application processors, microcontrollers, digital signal processors (DSPs), graphics processing units (GPUs), etc. Each processing unit may independently execute a stream of program instructions (e.g., a process or a task). The SoC may include a multi-level memory hierarchy. In some examples, some or all of the processing units may include a dedicated L1 memory and a dedicated L2 memory. The dedicated L1 and L2 memories, in some cases, may not be accessible by processing units other than the processing unit in which the dedicated memories are included. The L1 memory may include a separate L1 program memory and L1 data memory. The L1 program memory may store program instructions and the L1 data memory may store data for operations performed by the instructions in the program memory. The L2 memory may be a combined program and data memory, and may be referred to as a unified memory. In some examples, the memory hierarchy may include a shared memory subsystem that includes a shared L3 memory and a multicore shared memory controller. The shared L3 memory may be accessible by multiple processing units (e.g., multiple processing units may be able to read from and write to the L3 memory). The multicore memory shared memory controller may manage memory accesses to the shared memory as well as coherency between the L1, L2 and L3 memories. The multicore shared memory controller may also handle coherency between the L3 memory and an L4 DRAM.

The L1, L2, and L3 memories may each be independently configured as a cache or as a RAM (e.g., SRAM). When configured as a cache, the memory may use an internal cache replacement policy, and when configured as a RAM or SRAM, the memory may be directly addressable without using an internal cache replacement policy. The memory subsystem may further include an L4 memory interface or dynamic random-access memory (DRAM) interface that allows the multiple processing units to access a DRAM. In some examples, the DRAM may be included in the SoC. In other examples, the DRAM may be an off-chip memory. In some cases, the DRAM may be synchronous dynamic random access memory (SDRAM) and the DRAM interface may be an SDRAM interface. In further examples, the DRAM or SDRAM may be a double data rate SDRAM, and the DRAM or SDRAM interface may be a DDR SDRAM interface. DDR SDRAM may include or be alternatively referred to as DDR, DDR RAM, DDR2 SDRAM, DD3 SDRAM, DDR4 SDRAM, etc.

In some examples, each of the tensors may include a set of N feature maps. The feature maps may have R rows and C columns. The N feature maps may be referred to as channels. The feature maps associated with an input tensor may be referred to as input feature maps, and the feature maps associated with an output tensor may be referred to as output feature maps. In some examples, a single super tile as described herein may include data corresponding to all columns in multiple consecutive rows of all of the N feature maps. The multiple consecutive rows may be less than all of the rows. In other examples, the super tile may have other shapes, may or may not include all columns, may or may not include all rows, and may or may not include all of the N feature maps. In some examples, a set of feature maps (or a tensor) may be divided into at least first and second super tiles. In such examples, the processing techniques described herein may process the data in the first super tile through K layers of the CNN, and begin processing data for the second super tile in the same K layers of the CNN only after completing the K layers of processing for the first super tile, where K is an integer greater than one.

In some examples, when processing a single super tile through the K layers of the CNN, for at least one of layers, the processing techniques may overwrite the input feature map data for that particular layer with the output feature map data for that same layer. In some cases, the overwrite may occur in L3 shared memory when the L3 shared memory is configured as an SRAM (e.g., when not using an internal cache replacement policy). In such examples, the processing techniques may keep separate address spaces for the input feature map data and the output feature map data in the L2 memory. In other examples, the overwrite may occur in one or more other levels of the memory hierarchy (e.g., L1, L2, L3, or L4), and such levels may be configured as caches or as RAMs.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A method, comprising:
receiving a first set of values for processing by a machine learning network having multiple layers;
storing a first portion of the first set of values in an on-chip memory, wherein the first portion is less than all values of the first set of values, the first set of values including multiple portions;
processing the first portion of the first set of values in a first layer of the machine learning network to generate a portion of a second set of values;
overwriting the stored first portion of the first set of values with the generated first portion of the second set of values, including storing a first part of the first portion of the second set of values;
processing the first portion of the second set of values in a second layer of the machine learning network to generate a first portion of a third set of values;
storing the first portion of the third set of values to a memory;

repeating the steps of storing, processing, overwriting, processing, and storing for a next of the multiple portions of the first set of values until all of the multiple portions of the first set of values have been processed to generate all of multiple portions of the third set of values, wherein, in processing a second portion of the first set of values to generate a second portion of the second set of values, a first part of the second portion of the second set of values is not generated, the first part of the second portion of the second set of values being restored from the stored first part of the first portion of the second set of values; and outputting the third set of values.

2. The method of claim 1, wherein the on-chip memory comprises at least one of a cache memory or static random access memory.

3. The method of claim 1, wherein processing the first portion of the first set of values comprises:
dividing the first portion into a set of tiles; and
processing each tile of the set of tiles in the first layer of the machine learning network.

4. The method of claim 1, wherein the first layer and second layer are grouped in a layer group.

5. The method of claim 1, wherein the machine learning network comprises a convolutional neural network.

6. The method of claim 1, wherein:
the first part of the first portion of the second set of values is expected to be generated based on the second portion of the first set of values.

7. The method of claim 6, further comprising:
processing a first part of the first portion of the first set of values to generate a second part of the first portion of the second set of values, wherein the first part of the first portion of the first set of values is less than all values of the first portion of the first set of values and the second part of the first portion of the second set of values is less than all values of the first portion of the second set of values; and
storing the second part of the first portion of the second set of values;
wherein processing the first portion of the first set of values comprises:
generating the first portion of the second set of values without generating the second part of the portion of the second set of values, and
restoring the second part of the first portion of the second set of values from the stored second part of the first portion of the second set of values.

8. The method of claim 1, wherein a size for the first portion is predetermined based on the size of the on-chip memory.

9. The method of claim 8, wherein the predetermined size for the first portion is based on a separate analysis of the machine learning network.

10. The method of claim 1, wherein the set of values comprises a tensor and wherein the first portion is generated by removing values from one dimension of the tensor.

11. A device, comprising:
an on-chip memory; and
one or more processors operatively coupled to the on-chip memory, wherein the one or more processors are configured to execute non-transitory instructions causing the one or more processors to:
receive a first set of values for processing by a machine learning network having multiple layers;
store a first portion of the first set of values in the cache memory, wherein the first portion is less than all values of the first set of values, the first set of values including multiple portions;
process the first portion of the first set of values in a first layer of the machine learning network to generate a first portion of a second set of values;
overwrite the stored first portion of the first set of values with the generated first portion of the second set of values, including storing a first part of the first portion of the second set of values;
process the first portion of the second set of values in a second layer of the machine learning network to generate a first portion of a third set of values;
store the first portion of the third set of values to a memory;
repeat the operations of store, process, overwrite, process, and store until all of the multiple portions of the first set of values have been processed to generate all of multiple portions of the third set of values, wherein, in processing a second portion of the first set of values to generate a second portion of the second set of values, a first part of the second portion of the second set of values is not generated, the first part of the second portion of the second set of values being restored from the stored part of the first portion of the second set of values; and
output the third set of values.

12. The device of claim 11, wherein the on-chip memory comprises at least one of a cache memory or static random access memory.

13. The device of claim 11, wherein the instructions stored thereon further cause the one or more processors to process the first portion of the first set of values by:
dividing the first portion into a set of tiles; and
processing each tile of the set of tiles in the first layer of the machine learning network.

14. The device of claim 11, wherein the first layer and second layer are grouped in a layer group.

15. The device of claim 11, wherein the machine learning network comprises a convolutional neural network.

16. The device of claim 11, wherein the first part of the first portion of the second set of values is expected to be generated based on the second portion of the first set of values.

17. The device of claim 16, wherein the instructions stored thereon further cause the one or more processors to:
process a first part of the first portion of the first set of values to generate a second part of the first portion of the second set of values, wherein the first part of the first portion of the first set of values is less than all values of the first portion of the first set of values and the second part of the first portion of the second set of values is less than all values of the first portion of the second set of values; and
store the second part of the first portion of the second set of values;
wherein the instructions for processing the first portion of the first set of values further causes the one or more processors to:
generate the first portion of the second set of values without generating the second part of the first portion of the second set of values, and
restore the second part of the first portion of the second set of values from the stored second part of the first portion of the second set of values.

18. The device of claim 11, wherein the set of values comprises a tensor and wherein the first portion is generated by removing values from one dimension of the tensor.

19. A non-transitory program storage device comprising instructions stored thereon to cause one or more processors to:
- receive a first set of values for processing by a machine learning network having multiple layers;
- store a first portion of the first set of values in an on-chip memory, wherein the first portion is less than all values of the first set of values, the first set of values including multiple portions;
- process the first portion of the first set of values in a first layer of the machine learning network to generate a first portion of a second set of values;
- overwrite the stored first portion of the first set of values with the generated first portion of the second set of values, including storing a first part of the first portion of the second set of values;
- process the first portion of the second set of values in a second layer of the machine learning network to generate a first portion of a third set of values;
- store the first portion of the third set of values to a memory;
- repeat the execution of the instructions of store, process, overwrite, process, and store until all of the multiple portions of the first set of values have been processed to generate all of multiple portions of the third set of values, wherein, in processing a second portion of the first set of values to generate a second portion of the second set of values, a first party of the second portion of the second set of values is not generated, the first part of the portion of the second set of values, and
- output the third set of values.

20. The non-transitory program storage device of claim 19, wherein the on-chip memory comprises at least a cache memory or static random-access memory.

* * * * *